United States Patent
Hamadou et al.

(10) Patent No.: US 10,482,589 B2
(45) Date of Patent: Nov. 19, 2019

(54) METHOD AND APPARATUS FOR THE START-UP OPERATION OF A MULTI-AXIS SYSTEM

(71) Applicant: SIEMENS AKTIENGESELLSCHAFT, München (DE)

(72) Inventors: Mehdi Hamadou, Erlangen (DE); Jan Richter, Lauf an der Pegnitz (DE); Maximilian Walter, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 179 days.

(21) Appl. No.: 15/818,375

(22) Filed: Nov. 20, 2017

(65) Prior Publication Data
US 2018/0144459 A1    May 24, 2018

(30) Foreign Application Priority Data
Nov. 21, 2016 (EP) ................................ 16199731

(51) Int. Cl.
*B25J 9/16* (2006.01)
*G06T 7/00* (2017.01)
(Continued)

(52) U.S. Cl.
CPC .......... *G06T 7/0004* (2013.01); *B25J 9/1666* (2013.01); *B25J 9/1671* (2013.01); *G05B 19/058* (2013.01);
(Continued)

(58) Field of Classification Search
CPC ...... B25J 9/1697; B25J 9/1666; B25J 9/1671; G06K 9/00671; G06K 9/4652;
(Continued)

(56) References Cited

U.S. PATENT DOCUMENTS 9,722,628 B2    8/2017  Richter et al.
2014/0210947 A1*   7/2014  Finn .................... G01C 15/002
                                                            348/46

(Continued)

FOREIGN PATENT DOCUMENTS

DE          10226140 A1      1/2004
DE       112014000700 T5     10/2015
(Continued)

*Primary Examiner* — Duy M Dang
(74) *Attorney, Agent, or Firm* — Henry M. Feiereisen LLC

(57) ABSTRACT

A method for the start-up operation of a multi-axis system, the multi-axis system having segments which are movable by a controller in one or more axes, and a tool which is connected to one of the segments and is movable and drivable to a specified position by the controller. The method includes assigning a workspace and a safe space to the multi-axis system, arranging optical markers in an environment, making it possible for an augmented reality system to determine the position of a camera system which records the multi-axis system within the environment, defining a bounding body for each of the components such that the bounding body encloses the component, calculating a position of the bounding body during the movement of the multi-axis system, visualizing the bounding bodies together with an image recorded by the camera system, and checking whether the bounding body intersects with the safe space.

18 Claims, 1 Drawing Sheet

(51) Int. Cl.
- *G06T 7/50* (2017.01)
- *G06T 7/73* (2017.01)
- *G05B 19/05* (2006.01)
- *G06T 7/20* (2017.01)
- *G06T 19/00* (2011.01)

(52) U.S. Cl.
CPC ............... *G06T 7/20* (2013.01); *G06T 7/50* (2017.01); *G06T 7/73* (2017.01); *G06T 19/006* (2013.01); *G05B 2219/13098* (2013.01); *G05B 2219/32014* (2013.01); *G05B 2219/37009* (2013.01); *G05B 2219/39094* (2013.01); *G05B 2219/39449* (2013.01); *G05B 2219/40479* (2013.01); *G06T 2207/30164* (2013.01); *G06T 2207/30208* (2013.01); *G06T 2210/12* (2013.01)

(58) Field of Classification Search
CPC ....... G06K 9/4661; G06T 7/0004; G06T 7/50; G06T 7/73; G06T 19/006; G06T 7/0079; G06T 7/20; G05B 19/058; G05B 2219/37009; G05B 2219/39094; G05B 2219/39449; G05B 2219/40479; G05B 2219/40203; H04N 5/33

See application file for complete search history.

(56) References Cited

U.S. PATENT DOCUMENTS

2014/0277737 A1* 9/2014 Sekiyama ............. B25J 9/1697
 700/259
2015/0328776 A1* 11/2015 Shiratsuchi ........... B25J 9/1666
 700/255

FOREIGN PATENT DOCUMENTS

EP 2230054 A1 9/2010
EP 2783812 A2 10/2014

* cited by examiner

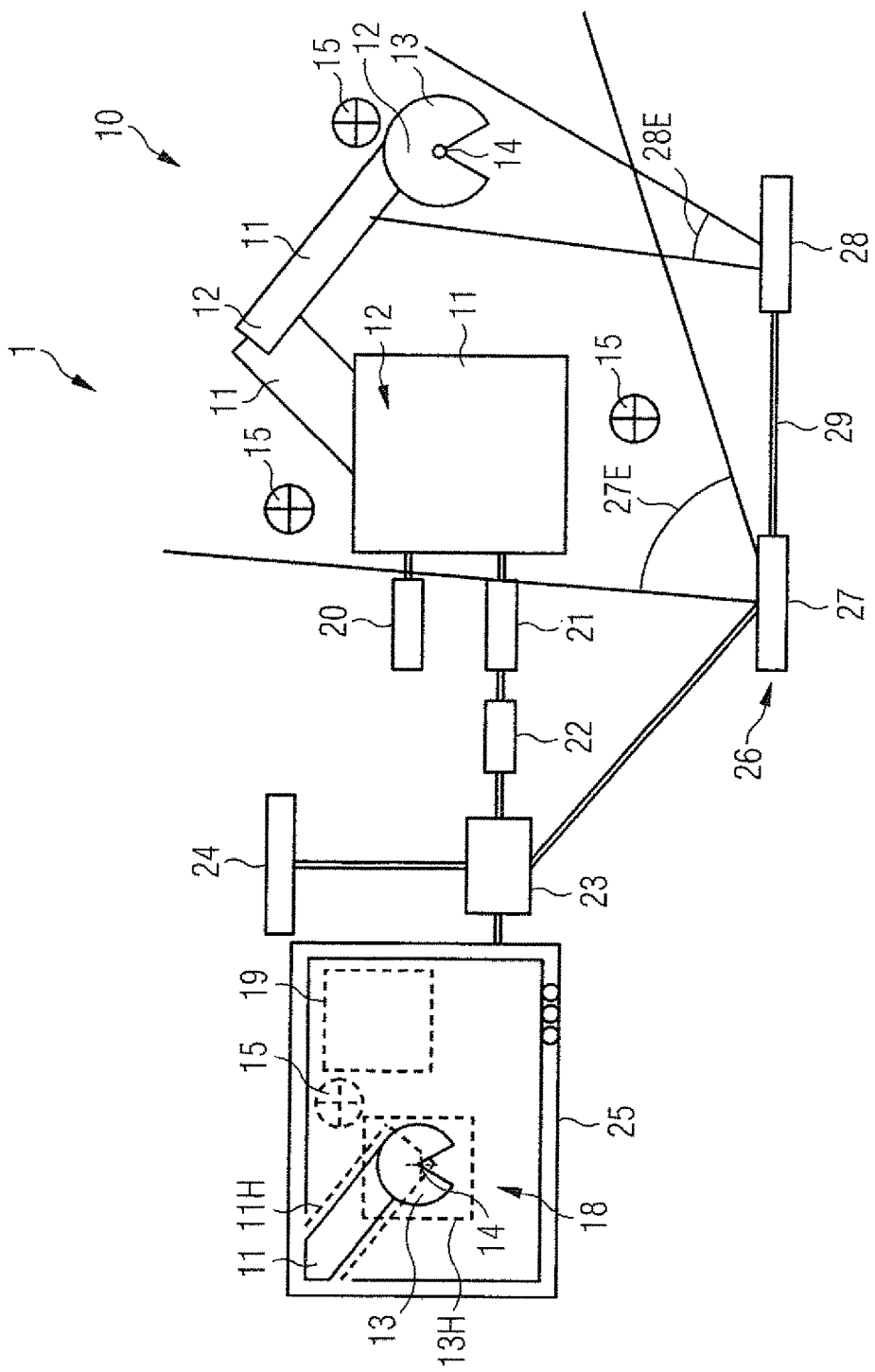

METHOD AND APPARATUS FOR THE START-UP OPERATION OF A MULTI-AXIS SYSTEM

CROSS-REFERENCES TO RELATED APPLICATIONS

This application claims the priority of European Patent Application, Serial No. 16199731, filed Nov. 21, 2016, pursuant to 35 U.S.C. 119(a)-(d), the disclosure of which is incorporated herein by reference in its entirety as if fully set forth herein.

BACKGROUND OF THE INVENTION

The present invention relates to a method and apparatus for the start-up operation of a multi-axis system.

The following discussion of related art is provided to assist the reader in understanding the advantages of the invention, and is not to be construed as an admission that this related art is prior art to this invention.

Multi-axis systems are universal, programmable machines for handling, assembling or machining workpieces. They are also referred to as (industrial) robots. They are designed for use in the industrial field. Once such a multi-axis system is programmed, it is capable of autonomously performing a work sequence or of varying, within limits, the performance of a task in dependence on sensor information.

The risks such multi-axis systems pose are due to the complex movement patterns and the great accelerations with simultaneously enormous forces that are frequently completely unpredictable for a person. Working beside an unsafe multi-axis system could therefore quickly result in severe injuries for a person located near the multi-axis system.

In order to prevent such accidents, safe monitoring of the position, position-dependent monitoring of the speed, of an acceleration and of the orientation of moving components of the multi-axis system are necessary. This is true in particular for work environments in which a multi-axis system is to cooperate with a person.

One prerequisite for correct and safe function of such a multi-axis system is the definition of bounding bodies for moving components and the correct definition of safe spaces and workspaces. Bounding bodies can have different geometric dimensions and shapes. Typically used bounding bodies are e.g. spheres, boxes or structures composed of a plurality of boxes. The definition of bounding bodies and the determination of safe spaces and workspaces permits cooperation between a multi-axis system and people, as long as it is certain that no bounding body of a component of the multi-axis system penetrates a safe space. If mistakes are made when defining these bodies, e.g. penetration of a bounding body into a safe space during running operation is not recognized, and therefore a safety function is erroneously not triggered.

Manually inputting coordinates, dimensions and orientation of the bounding bodies of the components of a multi-axis system into a program or database is known. In addition to a high manual effort, this procedure has the disadvantage that checking of the bounding bodies that are obtained from the input is susceptible to errors in reasoning and input. Another known possibility is that of defining safe spaces by moving the tool of the multi-axis system to the corners of all non-moving bodies, i.e. of the safe spaces and the workspace, while simultaneously capturing and storing corresponding coordinates. However, this variant is suitable only for bounding bodies of non-moving spaces, but not for bounding bodies of moving components of the multi-axis system.

Both above approaches operate in "point-orientated" fashion. A user defining the bounding bodies must therefore compose the bounding bodies in his or her mind from a plurality of points in the three-dimensional space. This requires great cognitive power and is therefore susceptible to errors. Moreover, it is not easy to identify whether a bounding body of a segment of the multi-axis system in fact actually completely contains the segment. A further problem is that it is impossible to readily determine whether a defined bounding body has been assigned to the correct segment of the kinematics of the multi-axis system. If this is not the case, the bounding body may in fact be located at the correct segment in the rest state, but upon movement follows e.g. another segment, and not the segment that is actually assigned to it.

It would be desirable and advantageous to provide an improved method and apparatus to obviate prior art shortcomings and to more reliably permit start-up operation of a multi-axis system in computer-supported fashion.

SUMMARY OF THE INVENTION

According to one aspect of the present invention, a method for the start-up operation of a multi-axis system is proposed. The multi-axis system includes, as components, a number of segments and a tool. The number of segments are connected in pairs by respective joints and are movable in one or multiple axes by way of a controller. The tool is connected to one of the segments and is movable and drivable to a specified position by way of the controller. Assigned to the multi-axis system is a workspace in which a presence and/or a movement of the components of the multi-axis system is permitted. Furthermore, at least one safe space that the components are not permitted to penetrate is assigned to the multi-axis system.

In order to carry out a start-up operation of the multi-axis system, the following steps are performed: a plurality of optical markers are arranged in the environment of the multi-axis system in order to make it possible for an augmented reality (AR) system to determine the position and orientation of a camera system which includes at least one camera and captures the multi-axis system from an environment.

For each of the components, one bounding body is defined and assigned thereto, wherein a bounding body that is assigned to a component encloses the assigned component, in particular completely. Subsequently, a check of the defined bounding bodies is carried out in relation to the workspace and the safe space by means of the AR system, in that, during a movement of the multi-axis system in space, the position of the bounding bodies in a first, global coordinate system (world coordinate system) is calculated and transformed into a second coordinate system corresponding to a position and orientation of the camera system (camera coordinate system), wherein the bounding bodies, which have been transformed into the second coordinate system, are visualized in the AR system together with an image that is recorded by the camera system.

With the proposed method a functionally safe definition and check of the bounding bodies and of the safe spaces and workspaces becomes possible. Any errors occurring when defining the bounding bodies or when assigning a bounding body to a respective component of the multi-axis system can be simply and quickly determined due to the possibility of the visual check in the AR system. Furthermore, the proposed method is less susceptible to faulty reasoning.

According to another advantageous feature of the present invention, position coordinates of the optical markers in the first global coordinate system can be ascertained and stored in the controller. Ascertaining the position coordinates can be performed in different ways.

In one variant, a TCP (tool center point) of the tool of the multi-axis system can be moved to a respective optical marker in order to ascertain the position coordinates of the optical marker. Next, the position coordinates of the TCP, which are known to the controller, can be ascertained as the position coordinates of the optical marker and stored. This means, according to this embodiment, the tool, in particular with its TCP, can be moved to the location of the optical marker. This movement can be performed manually, in what is known as inching operation, or automatically. Since, during a manual or automatically performed movement of the tool, the controller of the multi-axis system knows the position coordinates of the tool, or of the TCP thereof, it is possible for the position of the optical marker and the position coordinates thereof to be ascertained.

In another alternative, a mark that is applied on the tool, in particular the TCP, and the just processed optical marker can be captured by the AR system in order to ascertain the position coordinates of a respective optical marker. A distance between the mark and the optical marker can be ascertained. The position of the tool can be iteratively changed until the distance is minimum. The position coordinates of the tool, in particular of the TCP, which are known to the controller, can be ascertained at a minimum distance as the position coordinates of the optical marker and stored.

The TCP is a reference point that is known to the person skilled in the art and imagined in the environment of multi-axis systems and is located at a suitable site on the tool. In order to describe which location the tool of the multi-axis system assumes, it is sufficient for the position and orientation of TCP to be defined in the space, i.e. in the global coordinate system.

The second variant for ascertaining the position coordinates makes it possible for the position coordinates of the respective optical markers to be ascertained in automated fashion. Here, an iterative searching method is used, in which the tool, or the TCP, is moved until the distance between the tool, or TCP, and the currently observed optical marker becomes minimum. This procedure is repeated for all optical markers.

The mark that is applied on the tool, or the TCP, can be an optical mark that can be visually captured by the AR system. The mark can alternatively be a distance measuring unit. This can be e.g. a laser measurement device, which measures the distance from a point that is located in front of it. It can include, for example, a radio interface for transmitting a distance measured between the mark and the viewed optical marker to the AR system. The controller can then, on the basis of the transmitted distance, perform a targeted movement of the multi-axis system in order to minimize the distance in iterative steps from the respectively observed optical marker. The determination of the position coordinates of the respective optical marker is effected in turn from the knowledge of the position coordinates of the TCP at minimum distance between the viewed optical marker and the tool, or TCP.

According to another advantageous feature of the present invention, the distance can be ascertained by the distance measuring unit and transmitted to the AR system or the controller for further evaluation.

According to another advantageous feature of the present invention, the position coordinates of the optical markers can be transmitted to the AR system, and the AR system can ascertain the position and orientation of the camera system in the first global coordinate system on the basis of the optically captured markers and the assigned position coordinates.

For the definition of a respective bounding body, provision may be made for a number of position coordinates of an auxiliary marker that is temporarily arranged in the environment of the multi-axis system to be captured by the camera system and for the position coordinates thereof to be ascertained by the AR system. Using the auxiliary markers, it is possible, for example, for supporting points of the bounding bodies (e.g. corner points in the case of a box or a plurality of points on the surface of a sphere) to be defined. To this end, a user holds the auxiliary marker to the desired position of a supporting point. For example, after an input device has been operated for confirmation of a specific supporting point, the position coordinates are ascertained by the AR system and stored. Once all supporting points have been input, the bounding body can be calculated and stored. In the same way, the safe spaces and workspaces can be defined.

In an alternative, it is possible for defining a respective bounding body to be produced in accordance with the type and dimension of the component and to be iteratively changed in the AR system by way of an auxiliary marker, which is arranged in the environment of the multi-axis system, with respect to position and orientation until it completely bounds the assigned component. In this configuration, suitable bounding bodies are defined and produced in advance for each component. The exact location or size thereof can then be addressed using the AR system by using the already mentioned auxiliary markers.

According to another advantageous feature of the present invention, the workspace or at least one safe space can be visualized in the AR system. It is then possible using the AR system to check whether the previously defined and stored bounding bodies, safe spaces and workspaces match reality. It would be, for example, an error when a bounding body is too small and part of the multi-axis system were no longer bounded. This check can be done manually, i.e. by viewing the augmented camera image. Alternatively, the check can also be performed automatically. For example, when the multi-axis system is painted orange, but the overlaid bounding bodies are colored blue in the visualization, no more blue pixels must be present in the augmented image. This check can be performed by way of image recognition software.

In order to allow the AR system to determine the position and orientation of the camera system, it is necessary for one or more markers to be detectable in the image data recorded by the camera system. It may under certain circumstances be the case that no optical markers or too few optical markers are contained in the data recorded by the camera system. In this case it is expedient if a number of further, temporary markers be arranged in the environment of the multi-axis system, wherein the position coordinates of the number of temporary markers are determined by image processing of an image in which the number of temporary markers and the plurality of optical markers are contained. In order to thus be able to determine the position coordinates of the temporary markers, it is necessary for the camera system to be positioned and aligned in advance such that both the number of temporary markers and a sufficient number of optical markers are contained in the image data.

The optical markers mentioned in this description can be e.g. specific stickers, specific items or the like. It is likewise possible to define distinct edges and/or corners of the environment as optical markers.

According to another aspect of the present invention, a computer program product which can be loaded directly into the internal memory of a digital computer and includes software code with which the steps according to the method described in this description can be performed, when the product runs on a computer. A computer within this meaning can be the totality of the described controller as well as the AR system.

According to still another aspect of the present invention, an apparatus for the start-up operation of a multi-axis system is proposed. The multi-axis system includes, as components, a number of segments and a tool. The number of segments are connected by way of respective joints and are movable in one or more axes. The tool is connected to one of the segments and is movable and drivable to a specified position. Assigned to the multi-axis system are a workspace in which a presence and/or a movement of the components is permitted, and at least one safe space that the components are not permitted to penetrate.

The apparatus includes a controller for driving the components of the multi-axis system. The apparatus includes a camera system, which has at least one camera and which captures the multi-axis system from an environment. The apparatus includes an augmented reality (AR) system which captures the image captured by the camera system and processes it. The AR system is set up to define for each of the components a bounding body and to assign it thereto, wherein a bounding body, which is assigned to a component, encloses the assigned component, in particular completely. The apparatus includes a plurality of optical markers in the environment of the multi-axis system so as to permit the AR system to determine the position and orientation of the camera system capturing the environment of the multi-axis system. The apparatus finally includes an output apparatus of the AR system, which output apparatus is set up to perform a check of the defined bounding bodies with respect to the workspace and the safe space, in which, during a movement of the multi-axis system in the space, the position of the bounding bodies in a first, global coordinate system is calculated and transformed into a second coordinate system corresponding to a position and orientation of the camera system. The bounding bodies, which have been transformed into the second coordinate system, are visualized in the output apparatus of the AR system together with the image recorded by the camera system.

The apparatus in accordance with the invention has the same advantages as were described previously in connection with the method in accordance with the invention. The apparatus can include further means for performing the method.

BRIEF DESCRIPTION OF THE DRAWING

Other features and advantages of the present invention will be more readily apparent upon reading the following description of currently preferred exemplified embodiments of the invention with reference to the accompanying drawing in which the sole FIGURE shows a schematic illustration of an apparatus in accordance with the present invention for the start-up operation of a multi-axis system.

DETAILED DESCRIPTION OF PREFERRED EMBODIMENTS

The depicted embodiment is to be understood as illustrative of the invention and not as limiting in any way. It should also be understood that the FIGURE may not necessarily be to scale. In certain instances, details which are not necessary for an understanding of the present invention or which render other details difficult to perceive may have been omitted.

The sole FIGURE shows a schematic illustration of an apparatus 1 in accordance with the invention for the start-up operation of a multi-axis system 10. The multi-axis system 10 can be, for example, an industrial robot, a production or packaging machine, a CNC cutting machine, a loading crane or the like. However, a multi-axis system is also understood to mean a production cell having a plurality of such machines.

In the schematic illustration of the FIGURE, the multi-axis system 10 includes a number of segments 11 which are interconnected in pairs via a joint 12. Arranged at a free end of a last segment 11 is, by way of example, a tool 13 with a TCP (tool center point) 14. The tool position of the multi-axis system 10 is described by way of the TCP. The TCP is a reference point that is located at a suitable site on the tool 13.

The kinematics of the multi-axis system 10 are driven by a controller 20. The controller, e.g. a programmable logic controller (PLC), can be provided by a computational unit. Moreover, the multi-axis system 10 includes functionally safe sensors (not illustrated) for capturing the axial positions of the kinematics, i.e. of the individual segments 11 and joints 12. The values of the functionally safe sensors are read in by way of a functionally safe controller (referred to as F-SPS), on which a functionally safe program runs. Due to the functionally safe controller 21, the position of the TCP of the kinematics of the multi-axis system 10 can be calculated. The functionally safe controller 21 also calculates the current position of the kinematics bounding bodies in what is known as a world coordinate system. The controller checks whether intersection between later-described bounding bodies and the safe spaces exists, or whether a bounding body leaves the workspace. The task of the functionally safe controller 21 is moreover to monitor for the maintenance of a maximum speed during manual operation of the multi-axis system which can be necessary for performing a method step during the start-up operation of the multi-axis system. If one of these cases occurs, a safety function is performed, i.e. the stopping of the kinematics.

Although in the exemplary embodiment shown the controller 20 and the functionally safe controller 21 are shown as separate components, the controller 20 and the functionally safe controller 21 can also be realized in the form of a single controller.

The apparatus includes a programming device 22, which is connected to the controller and/or to the functionally safe controller 21 in order to load a program or parameters into the controller 20 or the functionally safe controller 21 and in order to read out values calculated thereby.

The apparatus 1 moreover includes a camera system 26. The camera system 26 includes a first camera 27, which captures the environment of the multi-axis system 10. The image captured by the first camera 27 is used to ascertain the position of the camera system and to orientate the camera system 26. The camera system 26 moreover includes an optional second camera 28. The optional second camera 28 serves for recording a specific section (in this description also referred to as a scene). If, in addition to the first camera 27, the camera system also includes the optional second camera 28, both are connected to each other by way of a rigid connection 29. As a result, the position and orientation of the first and of the second camera 27, 28 relative to one another is known. The use of two cameras 27, 28, as shown in this exemplary embodiment, permits observation of the scene from different angles. In the present exemplary embodiment, a capturing region of the first camera 27 is designated 27E, and a capturing region of the second camera 28 is designated 28E. It can easily be seen that the capturing region 27E captures the multi-axis system 10 in its entirety, while the capturing region 28E of the second camera 28 is selected such that in particular the tool 13 and part of the segment 11 holding the tool 13 are captured. The use of a second camera moreover reduces the risk of parts of the multi-axis system 10 being obscured.

The apparatus 1 moreover includes an AR system 23, which reads in the image captured by the first camera 27 and ascertains the position of the first camera 27, or of the pair of cameras, by evaluating the image information. The image of the second camera 28 and information from the functionally safe controller 21 are likewise read in by the AR system, combined with each other and transmitted to an output apparatus 25 for visualization.

The AR system 23 can be realized in the form of software and be executed on the programming device 22. Alternatively, the AR system 23 can be realized, as shown, as an independent component. In this case, a communication link to the programming device 22 exists.

An output apparatus 25, which in the present exemplary embodiment displays the image captured by the second camera 28, is connected to the AR system 23. In addition, defined bounding bodies which will be described in more detail below are overlaid by the AR system 23 on the components visible in the shown image section (here a segment 11 and the tool 13). The output apparatus 25 can be a computer, such as e.g. a PC, a laptop, a tablet, a smartphone, but also AR glasses and any other device for representing two-dimensional or three-dimensional images. In order to identify errors in the output apparatus 25, it is also possible to use diverse output apparatuses, e.g. one during the definition of the bounding bodies that will be described in more detail below, and another during the check.

In an alternative configuration, the first and the second camera 27, 28, the output apparatus 25 can be combined with the AR system 23 in a common device.

A number of markers 15 are distributed in the environment of the multi-axis system 10. Three such markers 15 are shown merely by way of example in the illustration of FIG. 1. The markers 15 can be optical markers, e.g. stickers, but also objects having a specific shape and/or color. However, edges and/or corners or other pronounced constituent parts of the multi-axis system 10 and/or of the environment of the multi-axis system can also generally be used as optical markers 15. It is advantageous if the markers 15 are arranged uniformly in space. By way of the markers 15, it is possible for the AR system 23 to perform exact position determination and ascertainment of the position and orientation of the camera system 26. If the AR system does not require markers for the position determination, because other components and/or technical units are used for the position determination, the markers 15 do not need to be optically capturable by the camera system 26.

The functionally safe definition and checking of bounding bodies and of safe spaces and workspaces is achieved by way of the method that is described in more detail below.

In a first step, a plurality of the markers 15 are arranged at suitable sites, which allow the AR system 23 to perform exact localization of the camera system 26. The sites where the markers 15 are placed are selected such that the markers 15 are capturable from as many viewing angles for the camera system 26 as possible.

In the next step, the position of the markers 15 in a global coordinate system of the kinematics of the multi-axis system 10 is ascertained. This is done e.g. by way of the TCP 14 of the tool 13 being moved onto a respective marker 15 and the position being confirmed by way of the input device 24. By way of a functionally safely implemented and performed forward transformation of the functionally safe controller 21, the Cartesian coordinates of the relevant marker 15 can be reliably ascertained. The markers 15 are thus ascertained in the global coordinate system of the multi-axis system 10.

Moving the TCP onto a respective marker 15 can be performed for example manually, in what is referred to as inching operation. The moving of the TCP onto a relevant marker can also be done automatically. To this end, a mark is applied on the TCP 14 of the tool 13, with the result that the AR system 23 is enabled to calculate the distance of the TCP 14 from the respective markers 15. For any given marker 15, the segments 11 of the multi-axis system are moved as part of a searching method until this distance becomes minimum. This procedure is repeated for all markers 15.

In a further alternative procedure of the automated operation, it is possible to realize the attachment of a laser rangefinder with radio interface (not illustrated) on the TCP 14. The AR system 23 recognizes the laser spot on the camera image, e.g. by switching on/off a laser of the rangefinder and observing the pixels in the camera image. The AR system 23 likewise identifies the marker 15 and calculates the distance between the laser spot and the relevant marker 15. Here, the AR system 23 reads the measured distance from the rangefinder per radio link and combines it with the coordinates of the TCP from the controller 20 of the multi-axis system 10. The controller 20 subsequently moves the kinematics of the multi-axis system 10 in accordance with the calculated distance until the laser spot is overlaid by the marker 15.

This procedure is performed until all markers 15 in the coordinate system of the multi-axis system 10 have been measured.

In a next step, the position coordinates of the markers 15 are transmitted from the functionally safe controller 21 into the AR system 23. The AR system 23 is thus enabled to deduce the position and direction of the camera system in the global coordinate system from a moving image of the camera system 26 that contains the markers 15.

If the previously captured markers 15 are not sufficient for ascertaining the position and direction of the camera system 26, because for example not all markers 15 or not a sufficient number of markers 15 are visible from all the necessary viewing angles, further temporary markers can be arranged in the environment of the multi-axis system 10. The position of the temporary markers (not illustrated) can be ascertained by the AR system 23 using the previously existing markers 15. Calibration of the temporary markers is not required. Instead of temporary markers, it is also possible to use already existing reference points, e.g. corner points of unmoving objects or the like, as temporary markers.

In a next step, the bounding bodies for the components (segments 11, joints 12, tool 13) of the multi-axis system 10 are defined.

Supporting points of the bounding bodies 11H, 13H are defined using a (e.g. user-guided) auxiliary marker and the input device. For example, a bounding body 11H, 13H can be in the shape of a box that is defined by a number of corner points. If the bounding body is a sphere, the sphere can be defined by at least three points on the sphere surface. A user holds the auxiliary marker to the desired position of a supporting point and activates the input device. This prompts the AR system 23 to calculate the position of the auxiliary marker. The calculation is performed on the basis of the image data and of the markers 15 that are contained in the image data and whose position in the first, global coordinate system is known. If all supporting points for a bounding body 11H, 13H have been input, the bounding body 11H, 13H is calculated and stored in the functionally safe controller 21. This is repeated for all the components of the multi-axis system 10. When defining the bounding bodies 11H, 13H, care should be taken that a respective bounding body 11H, 13H, which is assigned to a component, i.e. segment 11 or tool 13, respectively, encloses the component around its entire parameter.

Alternatively, the type and dimension of a bounding body can be defined, e.g. box, sphere or the like. The bounding body is then placed interactively via the input device and monitoring by the output apparatus by moving the auxiliary marker to the corresponding position and orientation. The input device 24 is used to confirm the correct position and orientation. Dimension, position and orientation of the placed bounding body can be subsequently adapted in a similar manner, until the desired accuracy is achieved.

Once all bounding bodies have been defined, the bounding bodies are divided into safe spaces, workspaces and bounding bodies. The bounding bodies are assigned to the individual components (segments 11, tool 13, joints 12) of the kinematics of the multi-axis system 10. It is to be understood that the one or more safe spaces and workspaces can have been set up as part of the definition of the bodies or been previously set up.

Checking the defined bounding bodies 11H, 13H is performed by way of the functionally safe controller 21 calculating the position of the bounding bodies possibly in dependence on current positions of the segments 11, 13 of the multi-axis system 10. The AR system 23 reads in the current position and orientation of the bounding bodies 11H, 13H and of the safe space 19 from the functionally safe controller 21. Subsequently, the AR system 23 transforms the bounding bodies 11H, 13H or the safe space 19 corresponding to the position and orientation of the camera system 26. The bounding bodies 11H, 13H and the workspace or workspaces 18 and the safe space or safe spaces 19 are overlaid with the actual image of the camera system 26 and are represented on the output apparatus 25. The workspace is shown merely schematically with the reference sign 18. FIG. 1 illustrates the bounding bodies 11H for the segment 11 and 13H for the tool 13 both in the form of boxes. Merely by way of example, a safe space 19 is visualized, by way of example in the form of a box. During a movement of the kinematics of the multi-axis system 10, the bounding bodies, presupposing their correct definition, follow the respective components of the multi-axis system 10. It is then possible to check using the AR system whether the previously defined and stored bounding bodies, safe spaces and workspaces match reality. It would be an error e.g. if a bounding body is too small and part of the multi-axis system is not bounded. This check can be performed manually, i.e. by viewing the augmented camera image. Alternatively, the check can also be performed automatically. For example, if the multi-axis system is painted orange, but the overlaid bounding bodies are colored blue in the visualization, no more blue pixels are allowed to appear in the augmented image. This check can be performed using image recognition software.

If necessary, the camera system 26 can be moved to observe the bounding bodies 11H, 13H and the workspace or workspaces and/or safe space or spaces 18, 19 from different viewing angles.

If the AR system 23 can exactly localize the position and orientation of the camera system 26 even without markers 15, then the arrangement of the markers 15 and the calibration thereof and transmission of position coordinates to the AR system 23 can be dispensed with. This is possible for example if it is possible, merely by analyzing the image of the camera system 26 or using special sensors which are installed for example on or in the camera system 26, to localize the position and orientation of the camera system.

For a given multi-axis system, e.g. a 6-axis robot, a step-by-step process can be determined, which guides through the definition of the bounding bodies. In this way, it is not possible to forget a component of the multi-axis system.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for the start-up operation of a multi-axis system, with the multi-axis system including, as components, a plurality of segments which are connected via respective joints and are movable by a controller in one or more axes, and a tool which is connected to one of the segments and is movable and drivable to a specified position by the controller, said method comprising:
   assigning a workspace to the multi-axis system, in which a presence and/or a movement of the components is permitted in the workspace;
   assigning a safe space in which the components are not permitted to penetrate the safe space;
   arranging a plurality of optical markers in an environment of the multi-axis system so as to enable an augmented reality (AR) system to determine a position and orientation of a camera system which records the multi-axis system within the environment;
   defining and assigning a bounding body for each of the components such that the bounding body encloses the component;
   calculating by the AR system a position of the bounding body in a first global coordinate system as the multi-axis system moves;
   transforming the position of the bounding body into a second coordinate system corresponding to the position and orientation of the camera system;
   visualizing the bounding bodies in the AR system together with an image that is recorded by the camera system; and
   checking by the controller whether the bounding body intersects with the safe space or whether the bounding body leaves the workspace.

2. The method of claim 1, wherein the bounding body completely encloses the component.

3. The method of claim 1, further comprising:
   ascertaining position coordinates of the optical markers in the first global coordinate system; and storing the position coordinates of the optical markers in the controller.

4. The method of claim 3, wherein the position coordinates of the optical markers are ascertained by
moving a tool center point (TCP) of the tool of the multi-axis system onto a respective optical marker,
ascertaining the position coordinates of the TCP that are known to the controller as the position coordinates of the optical marker, and
storing the position coordinates of the optical markers.

5. The method of claim 3, wherein the position coordinates of the optical markers are ascertained by
applying a mark on the tool,
recording the one of the optical markers just processed by the AR system,
ascertaining a distance between the mark and the one optical marker by iteratively changing the position of the tool until the distance is minimum,
ascertaining the position coordinates of the tool that are known to the controller as the position coordinates of the one optical marker, and
storing the position elements of the one optical marker.

6. The method of claim 5, wherein the mark is applied on the TCP of the tool.

7. The method of claim 5, wherein the mark is an optical mark.

8. The method of claim 5, wherein the distance is ascertained by a distance measuring unit and transmitted to the AR system and/or the controller for evaluation.

9. The method of claim 3, further comprising:
transmitting the position coordinates of the optical markers to the AR system, and
ascertaining, by the AR system, the position and orientation of the camera system in the first global coordinate system on the basis of the position coordinates of the optical markers and the assigned position coordinates.

10. The method of claim 1, wherein the bounding body is defined by
temporarily arranging an auxiliary marker in the environment of the multi-axis system,
recording by the camera system a plurality of position coordinates of the auxiliary marker, and
ascertaining the position coordinates by the AR system.

11. The method of claim 1, wherein the bounding body is defined by
producing the bounding body according to a type and dimension of the component,
arranging an auxiliary marker in the environment of the multi-axis system, and
iteratively changing the bounding body in the AR system by way of the auxiliary marker with respect to position and orientation until the bounding body completely bounds the component to which it is assigned.

12. The method of claim 1, further comprising visualizing the workspace and the safe space in the AR system.

13. The method of claim 1, wherein the controller checks whether the bounding body and/or safe space match(es) reality.

14. The method of claim 1, wherein the controller checks whether the bounding body intersects with the safe space or whether the bounding body leaves the workspace during a movement of the multi-axis system.

15. The method of claim 1, further comprising:
arranging a plurality of temporary markers in the environment of the multi-axis system, and
determining the position coordinates of the plurality of temporary markers by processing an image in which the plurality of temporary markers and the plurality of optical markers are contained.

16. A computer program for the start-up operation of a multi-axis system, said computer program being embodied in a non-transitory computer readable medium, wherein the computer program comprises software code, which when loaded into an internal memory of a digital computer causes execution of the steps of:
assigning a workspace to the multi-axis system, in which a presence and/or a movement of components of the multi-axis system is permitted in the workspace;
assigning a safe space in which the components are not permitted to penetrate the safe space;
arranging a plurality of optical markers in an environment of the multi-axis system so as to enable an augmented reality (AR) system to determine a position and orientation of a camera system which records the multi-axis system within the environment;
defining and assigning a bounding body for each of the components such that the bounding body encloses the component;
calculating by the AR system a position of the bounding body in a first global coordinate system as the multi-axis system moves;
transforming the position of the bounding body into a second coordinate system corresponding to the position and orientation of the camera system;
visualizing the bounding bodies in the AR system together with an image that is recorded by the camera system; and
checking by the controller whether the bounding body intersects with the safe space or whether the bounding body leaves the workspace.

17. An apparatus for the start-up operation of a multi-axis system, with the multi-axis system including, as components, a plurality of segments which are connected via respective joints and are movable by a controller in one or more axes, and a tool which is connected to one of the segments and is movable and drivable to a specified position by the controller, wherein a workspace is assigned to the multi-axis system, in which a presence and/or a movement of the segments and/or tool is permitted in said workspace, and wherein at least one safe space is assigned to the multi-axis system, in which the components are not permitted to penetrate said safe space, said apparatus comprising:
a controller for driving the components of the multi-axis system;
a camera system configured to record the multi-axis system in an environment of the multi-axis system,
an augmented reality (AR) system configured to capture and process an image recorded by the camera system, said augmented reality (AR) system defining, for each of the components, a bounding body and assign it the component, with the bounding body enclosing the component; and
a plurality of optical markers in the environment of the multi-axis system to permit the AR system to determine a position and orientation of the camera system that records the environment of the multi-axis system,
wherein the AR system includes an output apparatus configured to perform a check of the defined bounding bodies with respect to the workspace and the safe space by calculating a position of the bounding body in a first global coordinate system as the multi-axis system moves, transforming the position of the bounding body into a second coordinate system corresponding to the position and orientation of the camera system, and visualizing the bounding bodies in the AR system together with an image that is recorded by the camera system.

18. The apparatus of claim 17, wherein the bounding body completely encloses the component.

\* \* \* \* \*